(12) United States Patent
Kang et al.

(10) Patent No.: US 7,800,568 B2
(45) Date of Patent: *Sep. 21, 2010

(54) APPARATUS AND METHOD FOR INSPECTING LIQUID CRYSTAL DISPLAY

(75) Inventors: Dong Woo Kang, Gyeongsangbuk-do (KR); Soung Yeoul Eom, Gyeongsangbuk-do (KR); Bong Chul Kim, Daegu-si (KR); Ki Soub Yang, Gyeongsangbuk-do (KR)

(73) Assignee: LG Display Co., Ltd., Tokyo (JP)

( * ) Notice: Subject to any disclaimer, the term of this patent is extended or adjusted under 35 U.S.C. 154(b) by 906 days.

This patent is subject to a terminal disclaimer.

(21) Appl. No.: 11/442,144

(22) Filed: May 30, 2006

(65) Prior Publication Data
US 2007/0046318 A1    Mar. 1, 2007

(30) Foreign Application Priority Data
Aug. 30, 2005    (KR) .................. 10-2005-0080042

(51) Int. Cl.
*G09G 3/36* (2006.01)
(52) U.S. Cl. .......................... 345/87; 324/770
(58) Field of Classification Search .......... None
See application file for complete search history.

(56) References Cited

U.S. PATENT DOCUMENTS

| | | | | |
|---|---|---|---|---|
| 5,999,012 A | * | 12/1999 | Listwan | 324/770 |
| 6,246,253 B1 | * | 6/2001 | Kang et al. | 324/770 |
| 2002/0067184 A1 | * | 6/2002 | Smith et al. | 324/770 |

* cited by examiner

*Primary Examiner*—Alexander Eisen
*Assistant Examiner*—Robin Mishler
(74) *Attorney, Agent, or Firm*—Morgan, Lewis & Bockius LLP

(57) ABSTRACT

The liquid crystal display (LCD) inspection apparatus for inspecting an LCD panel includes a worktable which supports the LCD panel to be seated on a front side of the worktable, probe units which are electrically connected to the LCD panel, a backlight unit which supplies light to the LCD panel, an imaging unit which photographs an image of the LCD panel supported by the worktable, a first polarizing plate which is arranged between the imaging unit and the LCD panel to polarize the light, a second polarizing plate which is arranged between the LCD panel and the backlight unit to polarize the light, an illumination unit which emits illumination light to surfaces of the LCD panel, and an image processor which receives the image photographed by the imaging unit, and extracts defect information from the received image.

14 Claims, 8 Drawing Sheets

APPARATUS AND METHOD FOR INSPECTING LIQUID CRYSTAL DISPLAY

This application claims the benefit of Korean Patent Application No. P 2005-0080042, filed in Korea on Aug. 30, 2005, which is hereby incorporated by reference.

BACKGROUND OF THE INVENTION

1. Field of the Invention

The present invention relates to an apparatus for inspecting a liquid crystal display (LCD), and more particularly, to an LCD inspection apparatus that is capable of automatically and accurately detecting defects in the LCD panel, and an inspection method using the inspection apparatus.

2. Discussion of the Related Art

In general, an LCD inspection apparatus is able to easily inspect, with the naked eye, whether or not an LCD panel has defects. FIGS. 1 and 2 illustrate such an LCD inspection apparatus according to the related art. As shown in FIGS. 1 and 2, the related art LCD inspection apparatus includes a body 1, an inspection stage 2 arranged at one side of the body 1 to inspect an LCD panel 10, and a loading/unloading stage 7 arranged at the other side of the body 1 to load the LCD panel 10 on the inspection stage 2 or to unload the inspected LCD panel 10 from the inspection stage 2. The LCD inspection apparatus also includes a carrier 9 (of FIG. 2) mounted to the body 1 such that the carrier 9 is able to laterally move, thereby transferring the LCD panel 10 from the loading/unloading stage 7 to the inspection stage 2, or from the inspection stage 2 to the loading/unloading stage 7.

The inspection stage 2 includes probe units 3, and a worktable 4 that brings the LCD panel 10 into contact with the probe units 3 and also provides light. The worktable 4 includes a polarizing plate 4a and a backlight 4b (FIG. 2). A moving stage 5 is arranged in the rear of the worktable 4 to move the worktable 4 so that the worktable 4 is connected to the probe units 3 in a state of being aligned with the probe units 3.

As shown in FIG. 1, a sub-table 8 is mounted to the loading/unloading stage 7. The sub-table 8 serves to incline the LCD panel 10 transferred from a loader (not shown) of the loading/unloading stage 7 by a predetermined angle (for example, 60°). A microscope 6 is mounted to the body 1 in front of the inspection stage 2 such that the microscope 6 is able to move in vertical and lateral directions. When determining whether the LCD panel 10 has defects during a macroscopic inspection operation, the operator can use the microscope 6 to further precisely identify the defects in the LCD panel 10.

Next, an inspection procedure performed by the related art LCD inspection apparatus will be described as follows.

First, the LCD panel 10 to be inspected is transferred from the loader (not shown) of the loading/unloading stage 7 to the sub-table 8. The sub-table 8 inclines the LCD panel 10 by a predetermined angle while transferring the LCD panel 10 to the carrier 9. Subsequently, the carrier 9 places the LCD panel 10 on the inspection stage 2. Once the LCD panel 10 is seated on the inspection stage 2, the worktable 4 is moved toward the LCD panel 10 by the moving stage 5. Thereafter, the worktable 4 vacuum-chucks the LCD panel 10 so that the LCD panel 10 is fixed on the inspection stage 2, and then connects pads (not shown) of the fixed LCD panel 10 to lead pins (not shown) of the probe units 3, respectively. Thus, when an electrical connection is achieved between the LCD panel 10 and the probe units 3, a predetermined image signal from a pattern generator is input to the LCD panel 10 via the probe units 3. The pattern generator, which is an external image signal input unit, sequentially provides various image patterns. When the LCD panel 10 is illuminated by the backlight 4b, the various image patterns are sequentially displayed on the LCD panel 10. Accordingly, the operator can determine, through the displayed patterns, whether or not the LCD panel 10 has defects.

However, the above-described related art LCD inspection apparatus has various problems. For example, the related art LCD inspection apparatus inspects the LCD panel 10 depending on the naked eye of the operator, thereby easily causing an inaccurate inspection due to the operator's carelessness. Moreover, it becomes time-consuming for one operator to completely inspect the LCD panel 10 in view of its increasing size. In addition, as shown in FIG. 3, when fine dust D is attached to the surfaces of upper and lower substrates 11 of the LCD panel 10, even though the fine dust D is not a defect in the LCD panel 10, it is practically very difficult for the operator to distinguish a point defect PD in LCD panel 10 from the fine dust D. As a result, even non-defective products may be determined as being defective, thereby degrading yield and increasing manufacturing costs.

SUMMARY OF THE INVENTION

Accordingly, the present invention is directed to an apparatus and method for inspecting a liquid crystal display (LCD) that substantially obviates one or more problems due to limitations and disadvantages of the related art.

An object of the present invention is to provide an LCD inspection apparatus that is capable of automatically and accurately determining defects in an LCD panel, and an inspection method using the inspection apparatus.

Additional advantages, objects, and features of the invention will be set forth in the description which follows, and in part will become apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display (LCD) inspection apparatus for inspecting an LCD panel comprises a worktable which supports the LCD panel to be seated on a front side of the worktable, probe units which are electrically connected to the LCD panel supported by the worktable, a backlight unit which supplies light to the LCD panel, an imaging unit which photographs an image of the LCD panel, a first polarizing plate which is arranged between the imaging unit and the LCD panel to polarize the light, a second polarizing plate which is arranged between the LCD panel and the backlight unit to polarize the light, a illumination unit which emits illumination light to surfaces of the LCD panel supported by the worktable, and an image processor which receives the image photographed by the imaging unit, and extracts defect information from the received image.

In another aspect of the present invention, a liquid crystal display (LCD) inspection method comprises a panel preparation step for loading an LCD panel on a worktable, a first photographing step for supplying electric power to at least one of a first illumination unit and a second illumination unit to emit light to the LCD panel, and photographing an image of the LCD panel using an imaging unit, a second photographing step for supplying electric power to a backlight unit, consecutively supplying various pattern image signals to the LCD panel, to display various pattern images on the LCD panel, and photographing each pattern image of the LCD panel using the imaging unit, and a defect extraction step for comparing the photographed images to generate image points, which include substantial defects in the LCD panel and foreign matter, and extracting the substantial defects of the LCD panel based on the image points.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
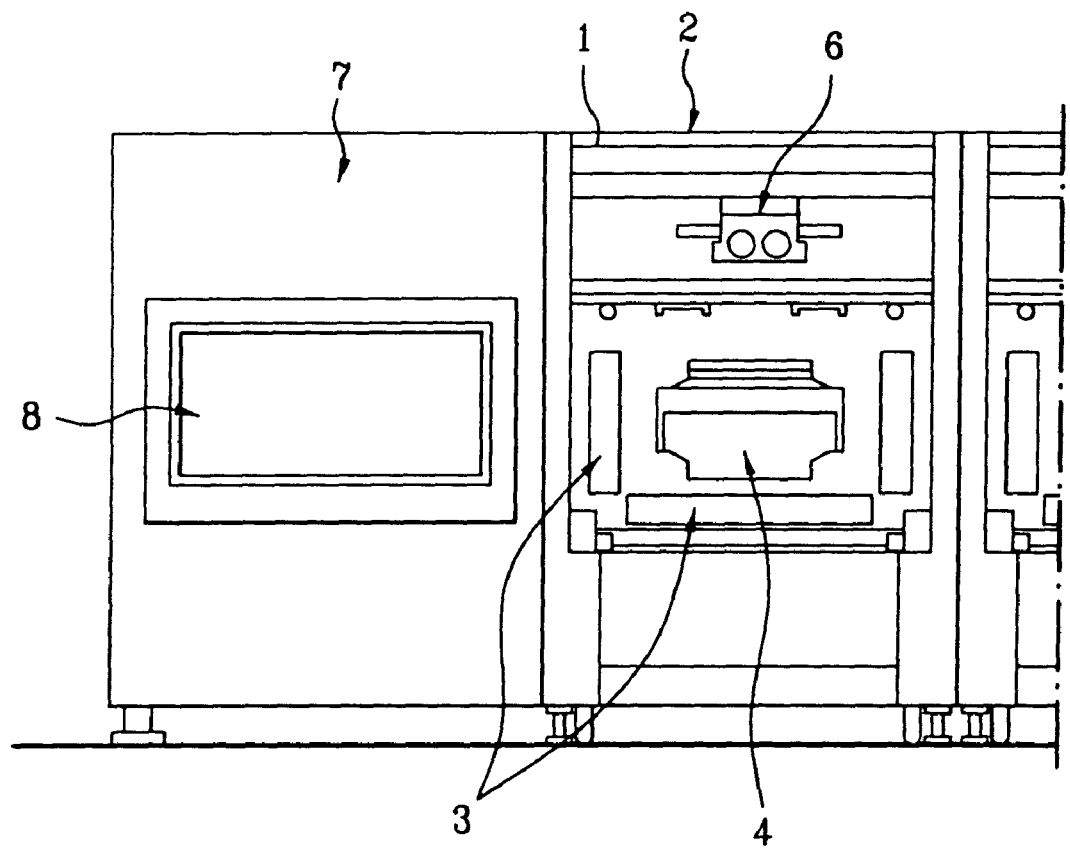
FIG. 1 is a front view schematically illustrating a liquid crystal display (LCD) inspection apparatus according to the related art.
Figure 2:
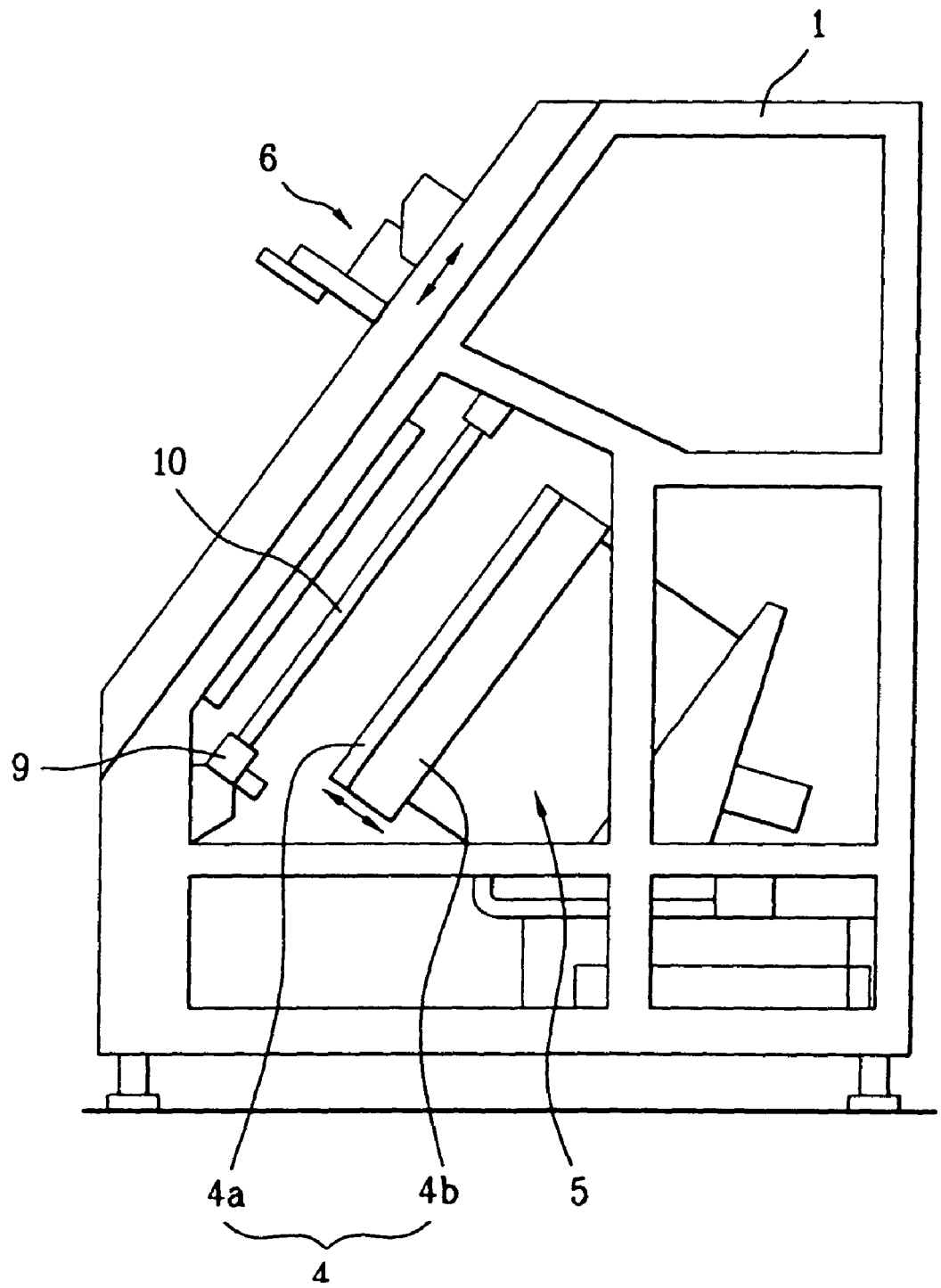
FIG. 2 is a side view schematically illustrating the LCD inspection apparatus of FIG. 1.
Figure 3:
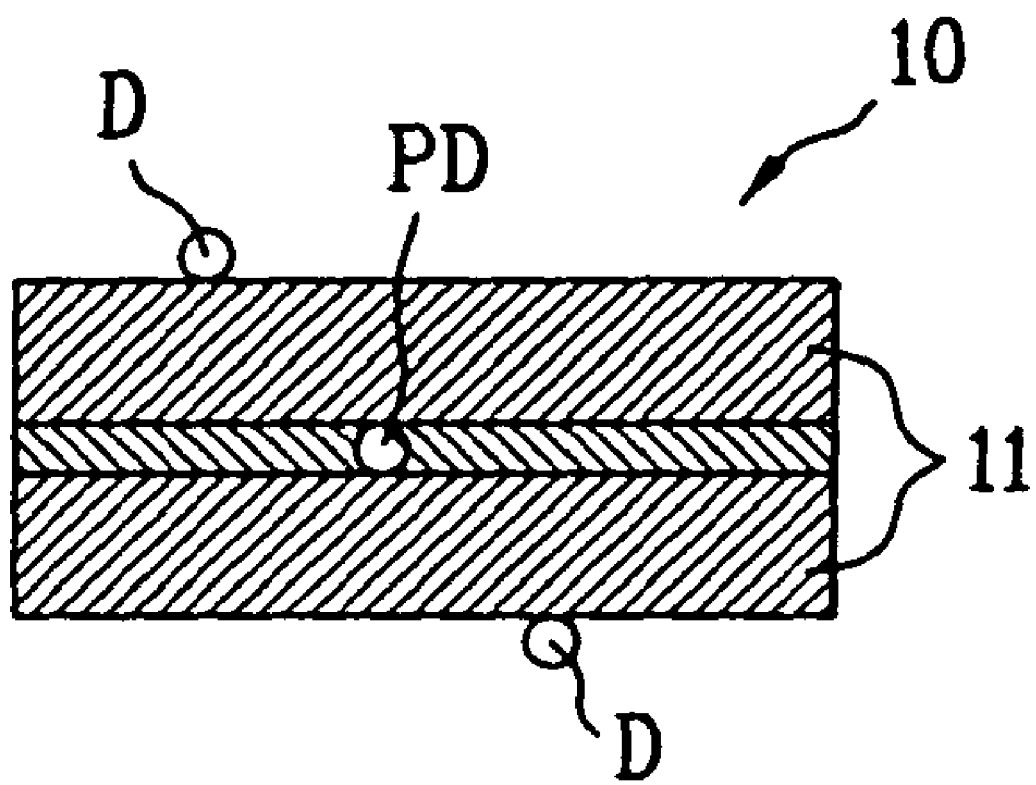
FIG. 3 is a sectional view of an LCD panel, illustrating an example of determining if the LCD panel has defects according to the related art.
Figure 4:
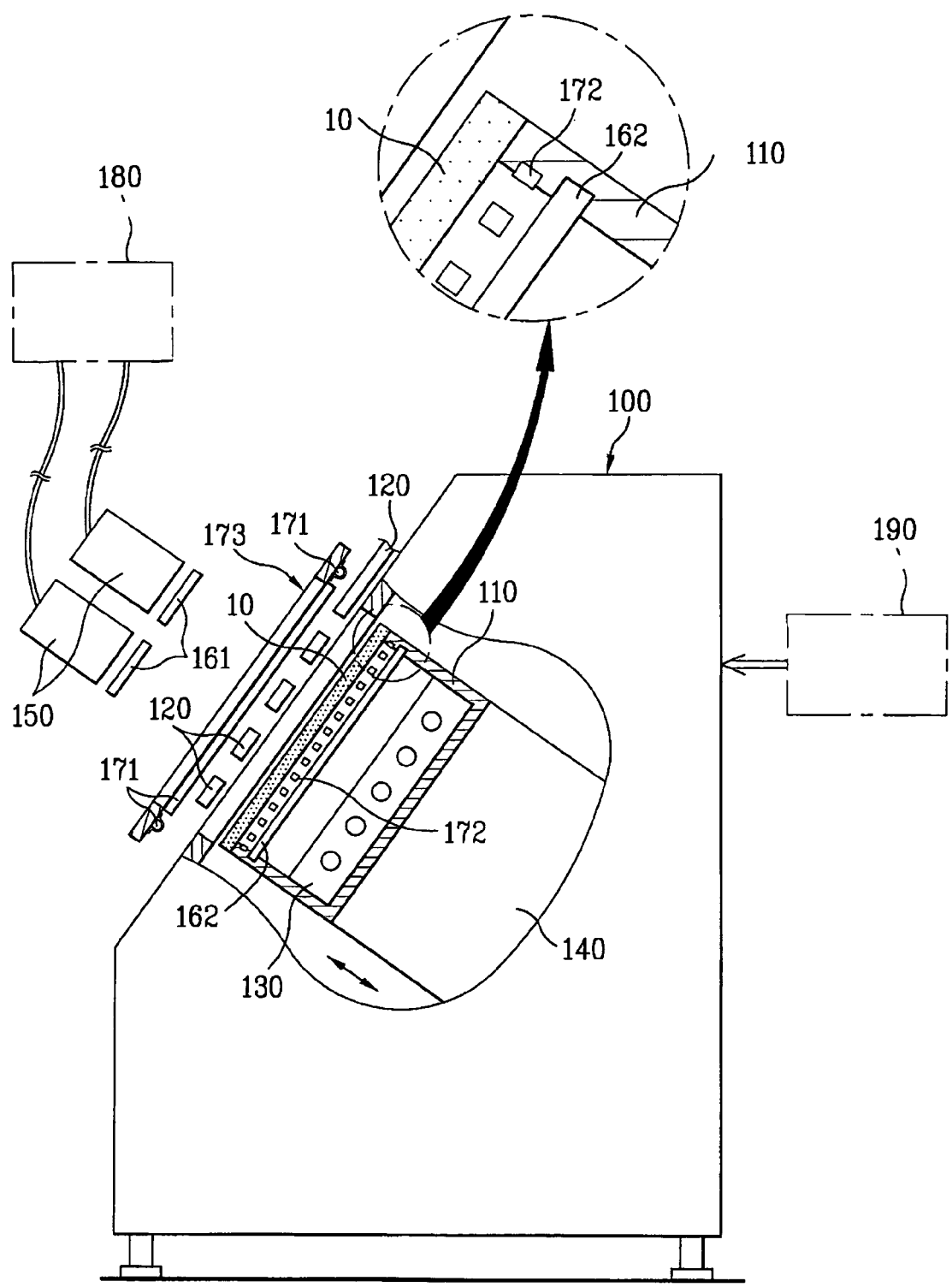
FIG. 4 is a side view schematically illustrating a configuration of an LCD inspection apparatus according to an exemplary embodiment of the present invention.

FIG. 4 is a side view schematically illustrating a configuration of an LCD inspection apparatus according to an exemplary embodiment of the present invention. As shown in FIG. 4, the LCD inspection apparatus includes a worktable 110, a plurality of probe units 120, a backlight unit 130, a moving stage 140, an imaging unit 150, a first polarizing plate 161, a second polarizing plate 162, first and second illumination units 171 and 172, and an image processor 180.

The worktable 110 is configured as a substantially-square hollow box, which has a longitudinal opening. An LCD panel 10 is arranged in a front side of the worktable 110. The front side of the worktable 110 faces the imaging unit 150. The plurality of probe units 120 are arranged around the opening of the worktable 110 in the front side of the worktable 110. Also, the plurality of probe units 120 are electrically connected to pads (not shown) of the LCD panel 10, respectively, and receive image signals of various patterns for inspection of the LCD panel 10 from a pattern generator 190, and supply the received image signals to the LCD panel 10.

The backlight unit 130 is arranged in a rear side of the worktable 110 to supply light to the LCD panel 10. Preferably, the backlight unit 130 may include a lamp that is selected from the group consisting of a cold fluorescent lamp (CFL), a cold cathode fluorescent lamp (CCFL), an external electrode fluorescent lamp (EEFL), and a high-brightness light emitting diode (LED). In particular, it is preferred that the backlight unit 130 be integrated with the worktable 110. The moving stage 140 is arranged in the rear of the worktable 110 to align the worktable 110 with the probe units 120, thereby connecting the worktable 110 to the probe units 120.

The imaging unit 150 may be a camera that photographs images of various patterns displayed on the LCD panel 10. As shown in FIG. 4, the imaging unit 150 is spaced apart from the front side of the worktable 110 by a predetermined distance. Preferably, the imaging unit 150 may include a charge coupled device (CCD) camera. More preferably, the imaging unit 150 may include a CCD camera having a resolution substantially equal to or higher than that of the LCD panel 10. In particular, it may be difficult to photograph the entire region of the LCD panel 10 using one imaging unit 150 in view of the recent trend of increasing sizes of the LCD panels. For this reason, the imaging unit 150 may include two or more imaging sub-units.

Figure 6:
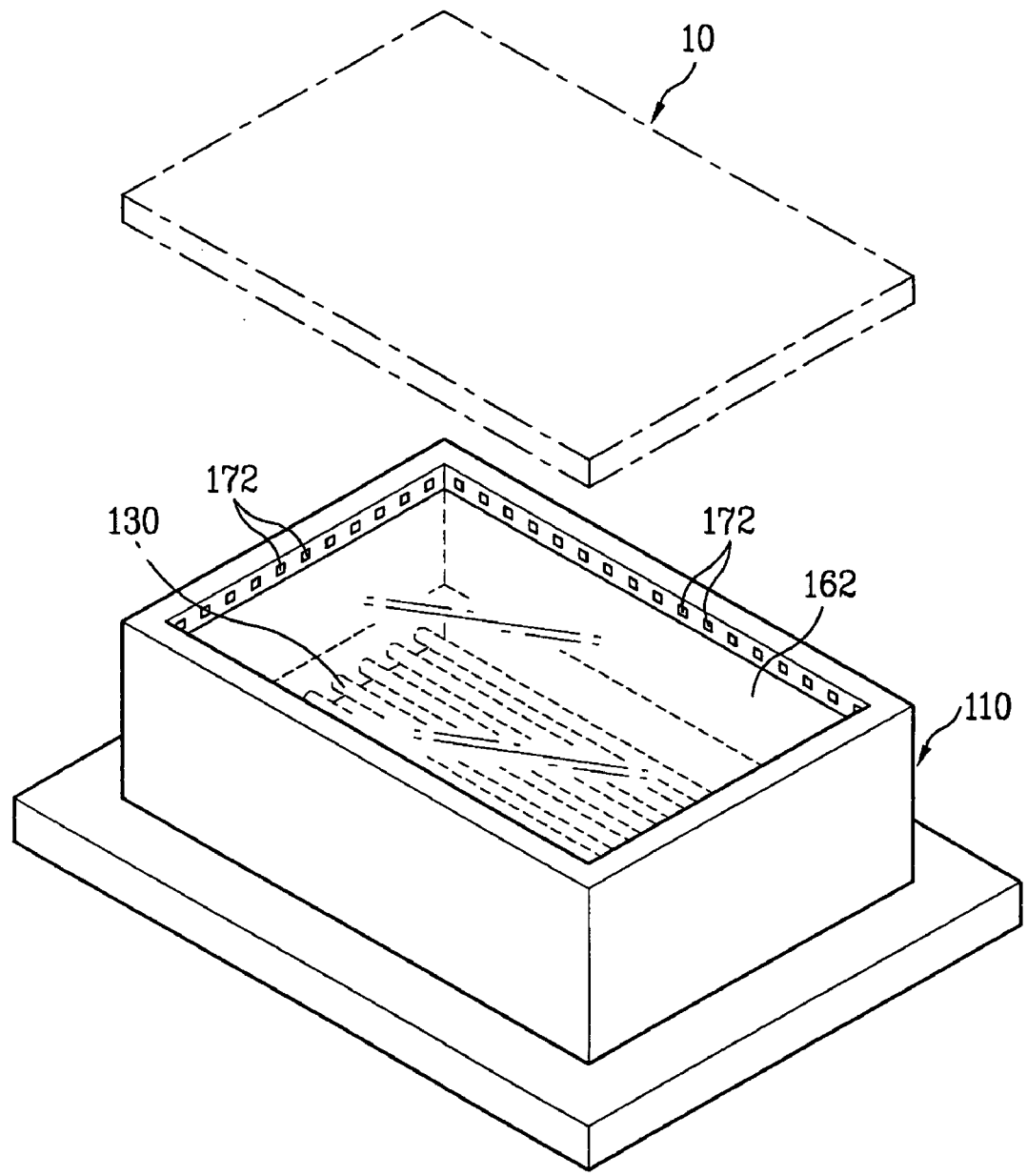
FIG. 6 is a schematic perspective view of a worktable of the LCD inspection apparatus in FIG. 4, illustrating how second illumination units are mounted on the worktable according to the exemplary embodiment of the present invention.

The first polarizing plate 161 is arranged between the imaging unit 150 and the LCD panel 10 to polarize light. The second polarizing plate 162 is arranged between the LCD panel 10 and the backlight unit 130 to polarize light. Preferably, the first polarizing plate 161 may be arranged adjacent to the imaging unit 150 as compared to the worktable 110. Otherwise, if the first polarizing plate 161 is arranged adjacent to the worktable 110, fine dust or foreign matter attached to the surface of the first polarizing plate 161 may be photographed, thereby mistakenly determining as defects in the LCD panel 10. On the other hand, as shown in FIGS. 4 and 6, the second polarizing plate 162 may be arranged inside the worktable 110 and close to the longitudinal opening of the worktable 110.

The first and second illumination units 171 and 172 enable the operator to identify the fine dust or foreign matter attached to the surfaces of the LCD panel 10 and the polarizing plates 161 and 162. For example, the operator can identify the foreign matter attached to the LCD panel 10 when the first and second illumination units 171 and 172 irradiate illumination light only to the (front and rear) surfaces of the LCD panel 10. The first and second illumination units 171 and 172 are arranged between the imaging unit 150 and the backlight unit 130. Preferably, the first and second illumination units 171 and 172 may be arranged along the peripheries of the LCD panel 10 seated on the worktable 110, thereby emitting the illumination light toward the surfaces of the LCD panel 10. Thus, the first and second illumination units 171 and 172 supply side light to the LCD panel 10 to enable the operator to more easily identify whether or not there is foreign matter present on the surfaces of the LCD panel 10.

Specifically, as shown in FIG. 4, the first illumination unit 171 is spaced apart from the LCD panel 10 toward the front surface of the LCD panel 10, whereas the second illumination unit 172 is spaced apart from the LCD panel 10 toward the rear surface of the LCD panel 10. Moreover, the first illumination unit 171 is preferably arranged between the first polarizing plate 161 and the LCD panel 10, whereas the second illumination unit 172 is preferably arranged between the second polarizing plate 162 and the LCD panel 10.

Figure 5:
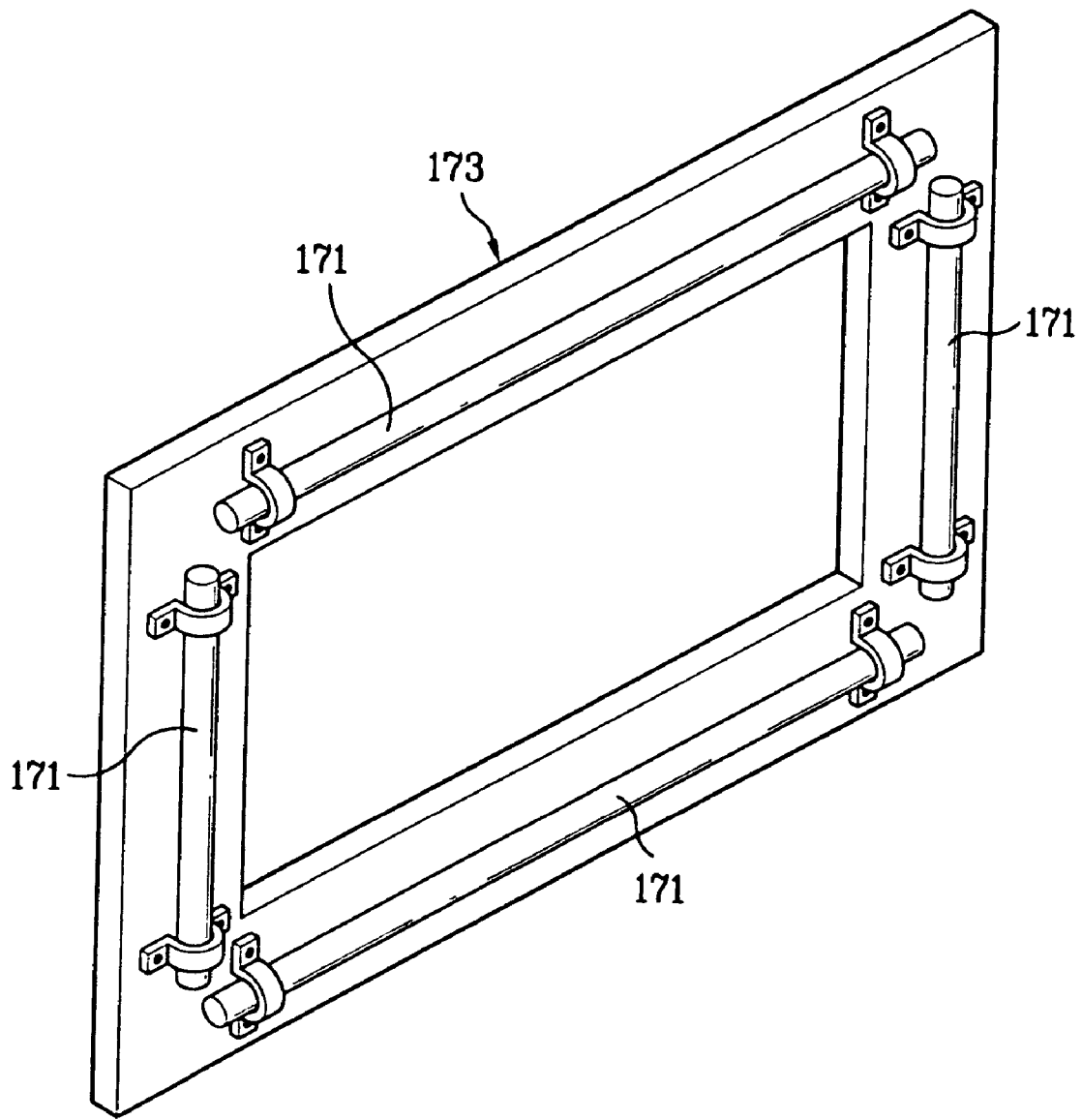
FIG. 5 is a schematic perspective view of a rear surface of a shield member of the LCD inspection apparatus in FIG. 4, illustrating how first illumination units are mounted on the shield member according to the exemplary embodiment of the present invention.

The LCD inspection apparatus further includes a shield member 173 arranged between the first polarizing plate 161 and the worktable 110. As shown in FIG. 5, the shield member 173 has a centrally-open rectangular frame structure. The first illumination unit 171 is mounted to a rear surface of the shield member 173 around the opening of the shield member 173. In the exemplary embodiment, the LCD inspection apparatus may include a plurality of first illumination units 171 which are mounted to respective sides of the shield member 173. For simplicity of description, the following description will be given only in conjunction with one first illumination unit 171. The shield member 173 is able to prevent the illumination light emitted by the first illumination unit 171 from being irradiated to the imaging unit 150, thereby preventing an image photographed by the imaging unit 150 from being excessively exposed to the light. Otherwise, if the image photographed by the imaging unit 150 is excessively exposed to the light, it is difficult to achieve an accurate defect inspection.

As shown in FIG. 6, the second illumination unit 172 is arranged in front of the second polarizing plate 162. Moreover, the second illumination unit 172 is mounted to an inner wall surface of the worktable 110 such that the second illumination unit 172 is embedded in the worktable 110 while being arranged along an inner periphery of the worktable 110. In the exemplary embodiment, the LCD inspection apparatus may include a plurality of second illumination units 172 that are arranged along the inner periphery of the worktable 110 while being uniformly spaced apart from one another. For simplicity of description, the following description will be given only in conjunction with one illumination unit 172. Preferably, each of the first and second illumination units 171 and 172 may include at least one lamp which is selected from the group consisting of a CFL, a CCFL, an EEFL, and a high-brightness LED. In particular, it is preferred that the first illumination unit 171 include a CFL, and the second illumination unit 172 include a CCFL.

The image processor 180 receives an image photographed by the imaging unit 150, and extracts defect information from the received image. The image processor 180 also converts the extracted defect information to corresponding data. Preferably, the image processor 180 may be connected to the pattern generator 190, thereby performing data transmission and reception therebetween.

Figure 7:
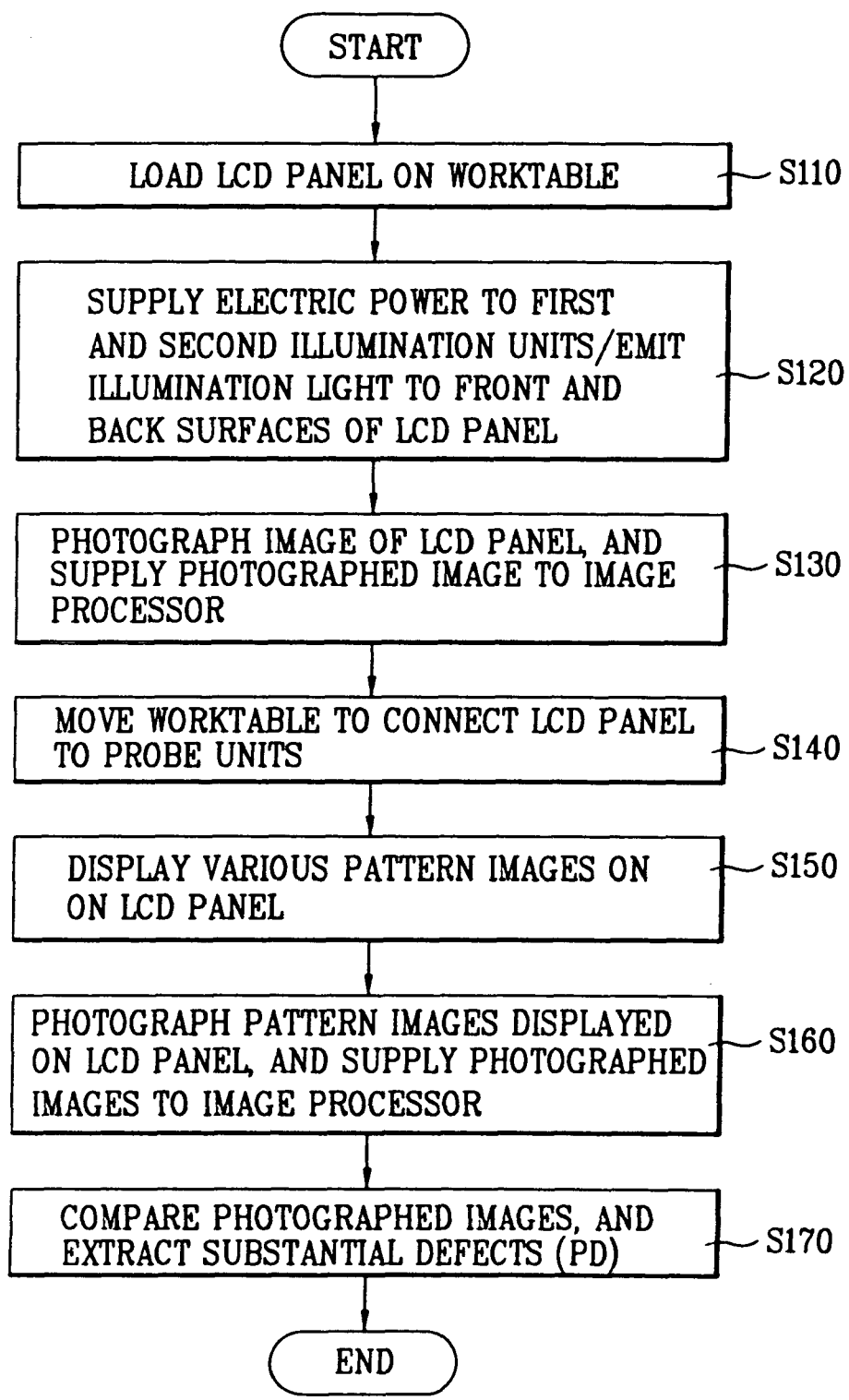
FIG. 7 is a flow chart explaining an LCD panel inspection method using the LCD panel apparatus of FIG. 4.

Next, an inspection method for inspecting the LCD panel 10 using the LCD inspection apparatus according to the above-described exemplary embodiment of the present invention will be described with reference to a flow chart of FIG. 7.

In this exemplary embodiment, the LCD inspection method includes 7 Steps of S110 to S170. As illustrated in FIG. 7, at Step of S110, a panel preparation is executed to place the LCD panel 10 on the worktable 110. Specifically, the LCD panel 10 is loaded on the worktable 110 such that the LCD panel 10 is seated on the front side of the worktable 110. In this Step, the LCD panel 10 has been subjected to a panel bonding process and a singulation process to be formed as a unit panel. The LCD panel 10 has also been formed with data shorting pads (not shown) for application of electric signals to a plurality of data lines, and gate shorting pads (not shown) for application of electrical signals to a plurality of gate lines. The data shorting pads and gate shorting pads are formed on the front surface of the LCD panel 10 along outer peripheral edges of the LCD panel 10.

At Step of S120, after the LCD panel 10 is seated on the worktable 110, electric power is supplied to at least one of the first and second illumination units 171 and 172 to irradiate the illumination light to the LCD panel 10. Preferably, the electric power may be supplied to both the first and second illumination units 171 and 172, thereby irradiating the illumination light to both the front and rear surfaces of the LCD panel 10. Since the first and second illumination units 171 and 172 are arranged around the peripheries of the LCD panel 10, the illumination light emitted from the illumination units 171 and 172 are supplied to the LCD panel 10 in the form of side light when viewing from a surface side of the LCD panel 10. As a result, the foreign matter on the surfaces of the LCD panel 10 is clearly shown in the form of shade. During the above-described procedure, no electric power is supplied to the backlight unit 130 and no image signal is supplied to the LCD panel 10. Accordingly, only the foreign matter present on the surfaces of the LCD panel 10 and the surfaces of the second polarizing plate 162 is displayed. The reason why the foreign matter present on the surfaces of the second polarizing plate 162 can be displayed is that the second polarizing plate 162 receives the illumination light emitted from the second illumination unit 172 as side light.

Thereafter, at Step of S130, a first photographing step is executed, during which an image of the LCD panel 10 is photographed by the imaging unit 150 and is supplied to the image processor 180.

At Step of S140, after completion of the above-described consecutive procedures, the moving stage 140 is driven to forwardly move the worktable 110. Thus, the shorting pads of the LCD panel 10 seated on the front side of the worktable 110 come into contact with the respective lead pins (not shown) of the probe units 120, thereby electrically connecting them.

At Step of S150, when a pattern image signal is output from the pattern generator 190 under the above-described condition, it is supplied to the LCD panel 10 via the probe units 120. At the same time, the backlight unit 130 emits light to irradiate the LCD panel 10, thereby displaying a pattern image on the LCD panel 10. In such a manner, various pattern images can be consecutively displayed on the LCD panel 10.

Figure 8:
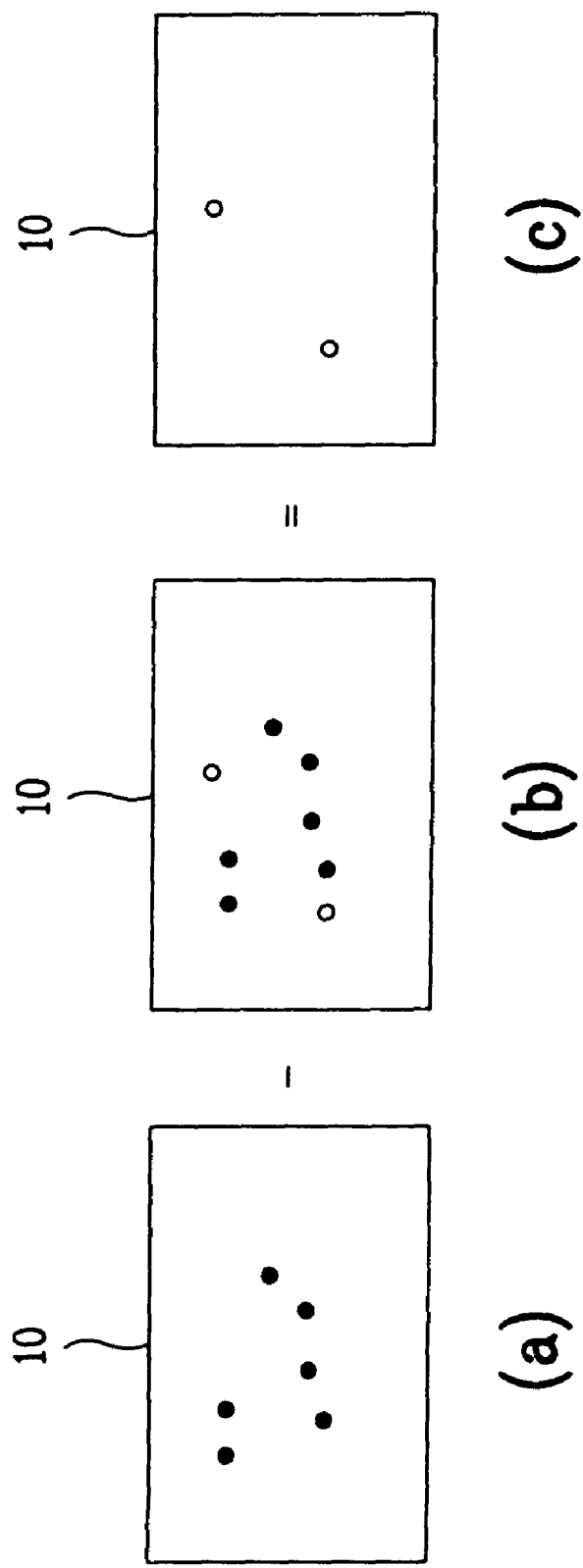
FIGS. 8A to 8C are schematic views explaining consecutive procedures for extracting substantial defects using the LCD inspection method according to an exemplary embodiment of the present invention.

At Step of S160, a second photographing step is executed by the imaging unit 150 every time a pattern image is displayed on the LCD panel 10. An image of the LCD panel 10 photographed at the second photographing step is supplied to the image processor 180. As shown in FIG. 8, the image photographed at the second photographing step not only includes image points representing foreign matter D present on the LCD panel 10, but also includes image points representing substantial defects, namely, point defects PD (defects in pixels at particular coordinates, namely, point defects) present on the LCD panel 10. At the second photographing step, no electric power is supplied to the first and second illumination units 171 and 172. Thus, the image of the LCD panel 10 is clearly photographed. Of course, the second photographing step may be executed before the execution of the first photographing step.

At Step of S170, after completion of the second photographing step, a defect extraction step is executed, during which the image processor 180 compares images output from the imaging unit 150, and extracts the substantial defects PD. That is, the image processor 180 determines some of the image points, which are present in common in the images photographed by the imaging units 150, to be the foreign matter D, and deletes coordinates of the foreign matter D from the list of all coordinates including the foreign matter D and the substantial defects PD. Thus, the image processor 180 extracts only a list of coordinates of substantial defects, namely, point defects PD.

This procedure will be described in detail with reference to FIGS. 8A to 8C. First, as shown in FIG. 8A, coordinates of the foreign matter D are acquired from the image photographed at the first photographing step (hereinafter, referred to as a "first image"). Subsequently, as shown in FIG. 8B, coordinates of the foreign matter D and the substantial defects PD are acquired from the image photographed at the second photographing step (hereinafter, referred to as a "second image"). Thereafter, the coordinates of the foreign matter D present in common in both the first image and the second image are deleted, thereby extracting only the coordinates of substantial defects PD, as shown in FIG. 8C.

The method for acquiring the coordinates of the foreign matter D and substantial defects PD is achieved by acquiring the coordinates of different pixel patterns between the first and second images. For example, extraction of the defect information is carried out by acquiring the coordinates of defective pixels generated when a pattern for inspection of dark points is displayed on the LCD panel 10, or the coordinates of defective pixels generated when a pattern for inspection of bright points is displayed on the LCD panel 10. Of course, the procedures for extracting substantial defects PD are not limited to those in which the coordinates of foreign matter D present in common in the first and second images are deleted. For example, the procedures for extracting substantial defects PD may be carried out by deleting the list of coordinates of foreign matter D present in the first image from the list of coordinates of the foreign matter D and the substantial defects PD present in the second image, irrespective of whether or not the foreign matter D is present in common in the first and second images.

It is preferred that the list of coordinates of the substantial defects PD extracted in the above-described consecutive procedures be displayed on the LCD panel 10 in a subsequent macroscopic inspection for the LCD panel 10, thereby enabling the operator to more accurately recognize the defects in the LCD panel 10. Meanwhile, in order to achieve a more accurate defect inspection, the LCD inspection method according to the exemplary embodiment of the present invention may further include a third photographing step. At the third photographing step, the imaging unit 150 is controlled to photograph an image of the LCD panel 10 after light is irradiated to the LCD panel 10 by supplying electric power only to the backlight unit 130.

The third photographing step includes consecutive procedures for preventing foreign matter, such as fine dust, present on the surfaces of the second polarizing plate 162 and backlight unit 130 from being extracted as defects. During the execution of the third photographing step, no electric power is supplied to the first and second illumination units 171 and 172 and also no image signal is supplied to the LCD panel 10. The image photographed at the third photographing step is supplied to the image processor 180. The image processor 180 compares the supplied image with the images photographed at the first and second photographing steps, thereby deleting information of foreign matter from the list of information of defects. That is, the image processor 180 determines some of the image points, which are present in common in the images respectively photographed at the first through third photographing steps, to be foreign matter D, and deletes coordinates of the foreign matter D. Thus, the image processor 180 extracts only a list of coordinates of substantial defects, namely, point defects PD. Accordingly, only the information of defective pixels is extracted. As a result, it is possible to achieve an accurate defect inspection for the LCD panel.

The LCD panel 10 can minimize the rate of defects generated in a final testing procedure carried out after the LCD panel 10 is applied to a modular product (namely, after assembly of the LCD panel 10 to a monitor or TV case) because the LCD panel 10 is completely manufactured after the inspection thereof through the inspection method according to the above-described exemplary embodiments of the present invention. Accordingly, it is possible to eliminate or minimize assembly of the LCD panel 10, which includes defects, to the modular product, thereby reducing the manufacturing costs. In addition, the LCD panel 10, which is completely manufactured after the inspection thereof through the inspection method according to the above-described exemplary embodiments of the present invention, exhibits a considerably low defect rate, as compared to LCD panels completely manufactured after being inspected through other inspection methods.

As described above, the LCD inspection apparatus and the inspection method using the same according to the exemplary embodiments can accurately inspect defects in the LCD panel 10. In particular, it is possible to accurately determine whether or not the LCD panel 10 has defects, using the LCD inspection method according to the exemplary embodiments of the present invention. As apparent from the above description, the LCD inspection apparatus and method according to the present invention have various advantages. First, the present invention is capable of achieving process automation because the defect inspection of an LCD panel according to the exemplary embodiments is carried out in such a manner that various defects in the LCD panel are automatically extracted by the image processor, based on a plurality of images photographed by the imaging unit. Second, the present invention is capable of achieving a very accurate defect inspection of an LCD panel because information identified as foreign matter, such as dust, attached to the surfaces of the LCD panel is excluded from information of substantial pixel defects.

It will be apparent to those skilled in the art that various modifications and variations can be made in the apparatus and method for inspecting the LCD of the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) inspection apparatus for inspecting an LCD panel, comprising:

a worktable that supports the LCD panel to be seated on a front side of the worktable;

probe units that are electrically connected to the LCD panel;

a backlight unit that supplies light to the LCD panel;

an imaging unit that photographs an image of the LCD panel;

a first polarizing plate that is arranged between the imaging unit and the LCD panel to polarize the light;

a second polarizing plate that is arranged between the LCD panel and the backlight unit to polarize the light;

a first illumination unit between the first polarizing plate and the LCD panel to irradiate a front surface of the LCD panel from a periphery of the LCD panel; and a second illumination unit between the second polarizing plate and the LCD panel to irradiate a rear surface of the LCD panel from a periphery of the LCD panel; and an image processor that receives the image photographed by the imaging unit and extracts defect information from the received image.

2. The LCD inspection apparatus according to claim 1, further comprising:
a shield member that is arranged between the first polarizing plate and the worktable and is configured with a centrally-open square frame.

3. The LCD inspection apparatus according to claim 2, wherein the first illumination unit includes a plurality of first sub-units mounted to a rear surface of the shield member while being arranged around a periphery of the shield member.

4. The LCD inspection apparatus according to claim 1, wherein:
the worktable includes a square box with a longitudinal opening; and
the second polarizing plate is arranged inside the worktable and adjacent to the longitudinal opening.

5. The LCD inspection apparatus according to claim 4, wherein the second illumination unit includes a plurality of second sub-units that are mounted around an inner wall surface of the worktable.

6. The LCD inspection apparatus according to claim 3, wherein at least one of the first and second illumination units includes one lamp selected from the group consisting of a cold fluorescent lamp (CFL), a cold cathode fluorescent lamp (CCFL), an external electrode fluorescent lamp (EEFL), and a high-brightness light emitting diode (LED).

7. The LCD inspection apparatus according to claim 5, wherein at least one of the first and second illumination units includes one lamp selected from the group consisting of a cold fluorescent lamp (CFL), a cold cathode fluorescent lamp (CCFL), an external electrode fluorescent lamp (EEFL), and a high-brightness light emitting diode (LED).

8. A liquid crystal display (LCD) inspection method comprising:
a panel preparation step for loading an LCD panel on a worktable;
polarizing plates preparation step for arranging a first polarizing plate on the LCD panel and a second polarizing late under the LCD panel to polarize lights;
a first photographing step for supplying electric power to at least one of a first illumination unit and a second illumination unit, to emit light to the LCD panel, and photographing an image of the LCD panel using an imaging unit, wherein the first illumination unit is between the first polarizing plate and the LCD panel to emit light to a front surface of the LCD panel, and the second illumination unit is between the second polarizing plate and the LCD panel to emit light to a rear surface of the LCD panel;
a second photographing step for supplying electric power to a backlight unit, consecutively supplying various pattern age signals to the LCD panel, to display various pattern images on the LCD panel, and photographing each pattern image of the LCD panel using the imaging unit; and
a defect extraction step for comparing the photographed images to generate image points, which include substantial defects in the LCD panel and foreign matter, and extracting the substantial defects based on the image points,
wherein the first polarizing plate is arranged between the imaging unit and the LCD panel, and the second polarizing plate that is arranged between the LCD panel and the backlight unit to polarize the light.

9. The LCD inspection method according to claim 8, wherein, during the first photographing step, no electric power is supplied to the backlight unit and no pattern image signal is supplied to the LCD panel.

10. The LCD inspection method according to claim 8, wherein, during the second photographing step, no electric power is supplied to the first and second illumination units.

11. The LCD inspection method according to claim 8, wherein, during the defect extraction step, the extraction of substantial defects is carried out by determining some of the image points, which are present in common in the images photographed at the first and second photographing steps, to be the foreign matter, and deleting coordinates of the foreign matter, thereby extracting only coordinates of the substantial defects.

12. The LCD inspection method according to claim 8, wherein the second photographing step is controlled to be executed before the first photographing step.

13. The LCD inspection method according to claim 8, further comprising:
a third photographing step for supplying electric power to the backlight unit, to emit light to the LCD panel, and then photographing an image of the LCD panel using the imaging unit, the third photographing step being executed before the defect extraction step,
wherein the defect extraction step is carried out by determining some of the image points, which are present in common in the image photographed at the third photographing step and at least one of the images photographed at the first and second photographing steps, to be the foreign matter, and deleting coordinates of the foreign matter, thereby extracting only coordinates of the substantial defects.

14. The LCD inspection method according to claim 13, wherein, during the third photographing step, no electric power is supplied to the first and second illumination units, and no pattern image signal is supplied to the LCD panel.

* * * * *